May 30, 1967 E. JUSTI ET AL 3,322,574
PROCESS AND APPARATUS FOR REMOVING REACTION WATER
FROM GALVANIC FUEL CELLS
Filed May 14, 1962 2 Sheets-Sheet 1

INVENTORS
EDUARD JUSTI
AUGUST WINSEL

BY
ATTORNEYS

INVENTORS
EDUARD JUSTI
AUGUST WINSEL

United States Patent Office 3,322,574
Patented May 30, 1967

3,322,574
PROCESS AND APPARATUS FOR REMOVING REACTION WATER FROM GALVANIC FUEL CELLS
Eduard Justi and August Winsel, Braunschweig, Germany, assignors to Varta Aktiengesellschaft, Hagen, Westphalia, Germany, and Siemens-Schuckert-Werke A.G., Berlin and Erlangen, Germany, a corporation of Germany
Filed May 14, 1962, Ser. No. 196,547
Claims priority, application Germany, May 15, 1961, R 30,344
24 Claims. (Cl. 136—86)

The present invention relates to a process and apparatus for the removal of reaction water forming during the operaton of galvanic fuel cells, and more particularly to a process for removing from a fuel cell - aqueous electrolyte, the electrochemically produced reaction water therein by electrochemical separation of the electrolyte ions from the reaction water in a portion of the electrolyte being treated, using an electrochemical dialysis cell for the desired purpose.

In galvanic fuel cells, such as an oxyhydrogen fuel cell in which hydrogen gas and/or fuel containing hydrogen in bound form is converted with oxygen or oxygen-containing oxidation agents, water is formed as the primary reaction product. It has been found in particular with respect to oxyhydrogen fuel cells operated with alkaline electrolyte for the electro-chemical combustion of hydrogen with oxygen that the reaction water formed undesirably dilutes the electrolyte.

For the conversion of gaseous fuels, such as hydrogen, double skeleton catalyst electrodes are particularly suitable, especially where the fuel cell is operated with a concentrated potassium hydroxide solution, preferably 6 N KOH, as electrolyte. The double skeleton catalyst electrodes consist of a support skeleton containing the Raney metal skeleton granules imbedded therein, these electrodes being suitably covered in German Patent 1,019,361 and U.S. Patent 2,928,891. Gaseous fuels may also be converted in fuel cells using known electrodes such as those of K. Kordesch (compare G. J. Young, "Fuel Cells," New York, 1960, Reinhold Publ. Corp., page 11) and F. T. Bacon (ibid, page 71), the latter type of electrode being operated high temperature in the order of 200° C. with corresponding elevated pressure, thus far above the boiling temperature of the usual electrolyte in an open cell.

In the typical oxyhydrogen gas fed fuel cell, a minimum of 1 mol or approximately 18 grams of water will be formed in the ideal case per 2 F (Faraday), which is equal to 2·96500 A./sec. (Coulombs) of discharge. Such reaction water must be removed continuously from the electrolyte in the continuous operation of the fuel cell, so that the concentration and concomitantly the electrical conductivity of the electrolyte does not become too low for the desired operation of the fuel cell to be carried out.

In fuel cells which are operated in the range from slightly below to slightly above the boiling point of the electrolyte used, the reaction water produced in the fuel cell may be removed easily through condensation from the water vapor situated above the electrolyte of the cell, such water vapor having a relatively high vapor pressure. With respect to fuel cells operating at room temperature or at temperatures up to about 60° C., the reaction water may be removed according to the usual techniques by drying the hydrogen gas or the oxygen gas, as the case may be, which passes to the particular electrode in a recycling circuit, as for example, by the use of a circulation pump. While any water vapor present in the circulating gas may be removed by drying such gas, it will be appreciated that this technique places otherwise unnecessary demands upon the hydrogen or oxygen circulation system since not only moisture but also inert gas constituents must be eliminated from the circulating gas and the content of the fuel gas used, for example hydrogen, must be continuously replenished with fresh gas to make up for losses in the drying.

It is an object of the present invention to overcome the foregoing drawbacks and to provide a process and apparatus for the efficient removal of the reaction water formed during the operation of galvanic fuel cells, wherein electro-chemical separation of the electrolyte ions from the reaction water in a portion of the electrolyte being treated is carried out in an electro-chemical dialysis cell.

Other and further objects of the present invention will become apparent from a study of the within specification and accompanying drawings in which.

Figure 4:
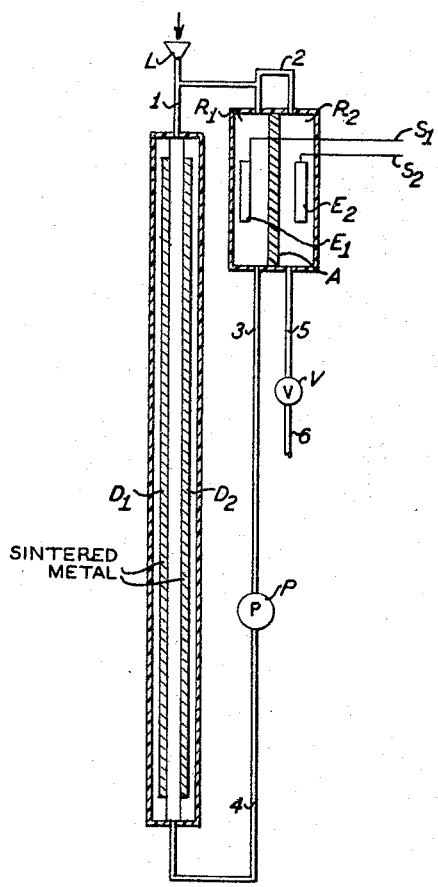
Figure 5:
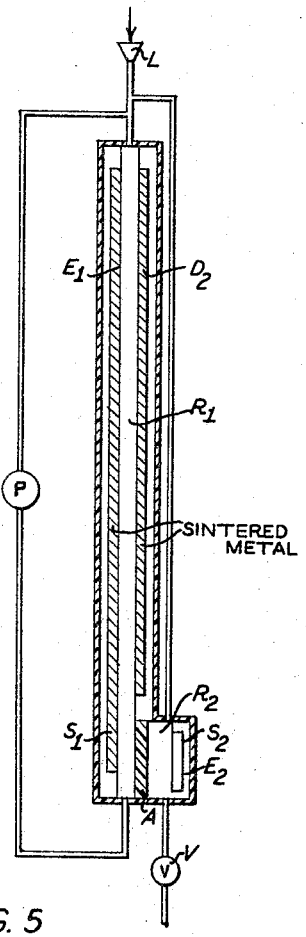

FIG. 4 is a further schematic view of an alternate embodiment in accordance with the present invention using a controlled overflow system for separating a portion of the electrolyte to be treated in accordance with the invention; and FIG. 5 is a schematic sectional view of another embodiment of the invention in which the dialysis cell and the fuel cell are combined, such that one of the electrodes of the fuel cell operates as a corresponding counter-electrode for the dialysis cell.

It has been found in accordance with the present invention that an improved process for removing from a fuel cell-aqueous electrolyte electrochemically produced reaction water present therein may be provided, which comprises carrying out the electro-chemical separation of the electrolyte ions from the reaction water in a portion of the electrolyte to be treated, using an electro-chemical dialysis cell for this purpose. Specifically, the dialysis cell contains a first portion of the aqueous electrolyte and has anode and cathode electrodes as well as an electrolyte ion-selective dialysis membrane means separating the anode and cathode electrodes of the cell. A second portion of the aqueous electrolyte to be treated is passed into a part of the dialysis cell separated by the membrane means from at least one of the electrodes and the first electrolyte portion. Accordingly, current may be conducted between the anode and cathode electrodes through the first electrolyte portion and the second electrolyte portion and the membrane means whereby to cause the migration of the corresponding electrolyte ions present in the second electrolyte portion through the membrane means selective therefor to the corresponding electrode and the first electrolyte portion. The first electrolyte portion thus enriched with the electrolyte ions electro-chemically separated from the second electrolyte portion may be readily recovered for reuse in the fuel cell.

Where the electrolyte is an alkaline aqueous solution, the membrane means will be cation exchange membranes, and the cathode and the first electrolyte portion will be separated by the membrane means from the part of the dialysis cell containing the second electrolyte portion, the anode being in contact with the second electrolyte portion.

Where the electrolyte is an aqueous solution of an acid, the membrane means will be anion exchange membrane means, and the anode and the first electrolyte portion will be separated by the membrane means from the part of the dialysis cell containing the second electrolyte portion, the cathode being in contact with the second electrolyte portion.

Where the electrolyte is an aqueous salt solution, the membrane means includes cation exchange membrane means as well as anion exchange membrane means. The cathode and a sub-portion of the first electrolyte portion to be enriched with cations from the salt solution will be separated by the cation exchange membrane means from the part of the dialysis cell containing the second electrolyte portion and from the anion exchange membrane means, whereas the anode and a sub-portion of the first electrolyte portion to be enriched with anions from the salt solution will be separated by the anion exchange membrane means from the part of the dialysis cell containing the second electrolyte portion and from the cation exchange membrane means as well. Conveniently, the sub-portion to be enriched with cations is in separate flow communication with the sub-portion to be enriched with anions, so that electrolyte may be flushed in turn through both of the sub-portions for enriching the fuel cell electrolyte with the desired salt ions in the desired manner.

In accordance with one embodiment of the invention, as for example where the electrolyte is selected from the group consisting of alkaline and acid aqueous electrolytes, the current being conducted between the electrodes of the dialysis cell may start automatically upon the filling to a predetermined amount of that part of the dialysis cell containing the second electrolyte portion, said current ceasing to flow when substantially all of the electrolyte ions have migrated through the membrane means. In this connection, after the electrolyte ions have so-migrated through the membrane means, substantially only water will remain in said part of the dialysis cell such that the resistance to electron flow, through the dialysis cell, reaches a predetermined maximum, whereupon in response to such maximum resistance, the part of the dialysis cell containing such water is automatically emptied thereof and the filling with a fresh second electrolyte portion repeated. On the other hand, where the electrolyte in question is an aqueous salt solution, one of the electrodes and the first electrolyte portion will be separated by the membrane means from the part of the cell containing the second electrolyte portion, whereas the counter-electrode of opposite polarity will not be in contact with the second electrolyte portion as is true in the case where an alkaline or acid electrolyte solution is used, but instead both electrodes will be suitably disposed in subportions of the first electrolyte portion while the salt solution in the second electrolyte portion will be subjected to electrolysis in the dialysis cell to cause the migration of the cation and anion salt ions therefrom leaving substantially only water in that part of the dialysis cell. In this case, the current being conducted between the electrodes of the dialysis cell will start automatically upon the filling to a predetermined amount of the part of the cell containing the salt solution while the current will cease to flow when substantially all of the electrolyte ions have migrated through the membrane means so as to leave substantially only water which exerts sufficient resistance to electron flow therethrough to cause the predetermined automatic emptying of the water to take place and the refilling with fresh salt solution for a repeated cycle.

In accordance with a particular embodiment of the invention, a process for operating a fuel cell using an aqueous electrolyte and reactants which electrochemically produce energy as well as water as reaction product, is contemplated, wherein the periodic electrochemical separation of the reaction water may be carried out during the fuel cell operation. While the fuel cell operation is continuously maintained, upon the reaching of a predetermined volume increase in the aqueous electrolyte due to the reaction water produced, a first predetermined excess volume portion of the electrolyte during further fuel cell operation will be caused to pass to an electrolytic dialysis cell having anode and cathode electrodes and electrolyte ion-selective dialysis membrane means separating the anode and cathode electrodes of the electrolytic dialysis cell, whereupon a second predetermined excess volume portion of the electrolyte may be passed during further fuel cell operation to a part of the electrolytic dialysis cell separated by the membrane means from at least one of the electrodes and the first excess portion. Then the current may be conducted between the anode and cathode electrodes of the electrolytic dialysis cell through the first excess portion and the second excess portion and the membrane means to cause the migration of the corresponding electrolyte ions present in the second excess portion through the membrane means selective therefor to the counter electrode of opposite polarity and the first excess portion. The first excess portion enriched with the electrolyte ions electrochemically separated from the second excess portion in the foregoing manner, may be conveniently recycled back to the aqueous electrolyte of the fuel cell while the second excess portion may be withdrawn for the reception of fresh second excess portion during the further operation of the fuel cell.

In the usual case, the fuel cell operation contemplated will be that operation which leads to the formation of reaction water by the electrochemical combustion of an oxidant with a hydrogen-containing fuel, such as, for example the formation of water in an oxyhydrogen cell by the electrochemical combustion of oxygen with hydrogen.

It is preferred in accordance with the various embodiments of the invention to circulate the electrolyte solution between the fuel cell and the part of the electrolytic dialysis cell containing the first excess portion in order to distribute efficiently the ions recovered from the reaction water portion being separated from the system.

In accordance with a further embodiment of the invention, a process and apparatus is provided for operating a fuel cell having cathode and anode electrodes and using an aqueous electrolyte and reactants which electrochemically produce energy as well as water as reaction product, in which the periodic electrochemical separation of the reaction water is carried out during the fuel cell operation with an electrolytic dialysis half cell coupled with the fuel cell proper. In this regard, upon reaching a predetermined volume increase in the aqueous electrolyte of the fuel cell due to the reaction water produced, a predetermined diluted excess volume portion of the electrolyte is passed during further cell operation to the electrolytic dialysis half cell, such half cell having an electrode and being separated by an ion-selective dialysis membrane means from the electrolyte in the fuel cell so as to form a dialysis cell with a corresponding counter electrode of opposite polarity in the fuel cell. Current is then conducted between the electrode of the half cell and the corresponding counter electrode of the fuel cell through the electrolyte in the fuel cell, the electrolyte portion in the half cell and the membrane means whereby to cause the desired migration of the corresponding electrolyte ions present in the electrolyte portion in the half cell through the membrane means selective therefor to the corresponding counter electrode and the electrolyte in the fuel cell to enrich the electrolyte in the fuel cell therewith. The remaining electrolyte portion may be discarded from the half cell or withdrawn in any useable form therefrom so that additional space will exist in the half cell for the reception of additional fresh dilute excess portion during the further operation of the fuel cell. In accordance with this embodiment of the invention, preferably, the portion of the electrolyte in the vicinity of the corresponding counter electrode in the fuel cell to which the electrolyte ions migrate, is circulated through the fuel cell so as to distribute the electrolyte ions evenly therethrough.

In accordance with the foregoing embodiment of the invention, the fuel cell operation will cause the formation of water by the electrochemical combustion of the reactants employed, and where oxygen is combusted with hydrogen-containing fuel, it is preferred that the corresponding counter electrode in the fuel cell is the oxidant electrode of the fuel cell and is simultaneously the cathode of the dialysis cell, in which case the aforementioned dialysis half cell will contain the anode. On the other hand, the said corresponding counter electrode in the fuel cell may be the fuel electrode of the fuel cell, in which case the same will be simultaneously the anode of the dialysis cell while the half cell will contain the cathode.

Significantly, the electrodes of the dialysis cell may be water decomposition electrodes, in which case water electrolysis is carried out in the dialysis cell between the electrode in the half cell and the corresponding counter electrode in the fuel cell simultaneously with the dialysis cell migration of electrolyte ions from the half cell through the membrane means to the corresponding counter electrode in the fuel cell. Advantageously, the electrolytic gases formed in the dialysis cell may be used as fuel gas and oxidant in the fuel cell operation.

Preferably, at least with respect to the dialysis cell, the half cell electrode and the corresponding counter electrode in the fuel cell may be porous valve electrodes. Such valve electrodes are at least partially immersed in the respective electrolyte solution and include a catalytically active porous working layer and a catalytically inactive surface layer. A portion of the surface layer should cover at least the portion of the working layer of the electrode immersed in the respective electrolyte solution and should be connected solidly thereto. The portion of the surface layer covering the portion of the working layer must have an average pore radius which is smaller than the average pore radius of the working layer. The working layer will be advantageously in separate communication with a gas space for the collection of gas electrochemically formed in the water electrolysis.

Advantageously, in accordance with the present invention, an improvement is provided in the process for operating the galvanic fuel cell having anode and cathode electrodes and an aqueous electrolyte for the production of electrical energy in which hydrogen-containing fuel is electrochemically converted with the formation of water as reaction product, such improvement comprising the carrying out of the fuel cell operation with the periodic electrochemical separation of the reaction water upon the reaching of a predetermined volume increase in the aqueous electrolye due to the production of such reaction water, by passing a first portion of the electrolyte to an electro-dialysis cell containing anode and cathode electrodes and an electrolyte-ion selective dialysis membrane means separating the anode and cathode electrodes of the dialysis cell and thereafter passing a hecond portion of the electrolyte into a part of the cell separated by the membrane means from at least one of the electrodes of the dialysis cell and the first electrolyte portion, whereby current may be conducted effectively between the anode and cathode electrodes of the dialysis cell and through the first electrolyte portion, the second electrolyte portion, and the membrane means. In this manner, the migration of the corresponding electrolyte ions present in the second electrolyte portion through the membrane means selective therefor will be carried out, such ions passing to the counter electrode of opposite polarity and the first electrolyte portion, whereby the first electrolyte portion may be recovered in a form enriched with the electrolyte ions electrochemically separated from the second electrolyte portion. Of course, the particular separation to be effected will depend upon the type of electrolyte involved, i.e. whether the electrolyte is an alkaline aqueous solution, an aqueous solution of an acid, or an aqueous salt solution.

In this regard where the electrolyte is an alkaline aqueous solution, then the membrane means will be cation exchange membrane means, and the cathode and first electrolyte portion will be separated by the membrane means from the part of the dialysis cell containing the second electrolyte portion, with the anode being in contact with the second electrolyte portion. Where the electrolyte is an aqueous solution of an acid, then the membrane means will be anion exchange membrane means and the anode and the first electrolyte portion will be separated by the membrane means from the part of the dialysis cell containing the second electrolyte portion, with the cathode being in contact with the second electrolyte portion. Lastly, where the electrolyte is an aqueout salt solution, then the membrane means will be both cation exchange membrane means and anion exchange membrane means with the cathode and a sub-portion of the first electrolyte portion to be enriched with cations from the salt solution being separated by the cation exchange membrane means from the part of the dialysis cell containing the second electrolyte portion and from the anion exchange membrane means, and with the anode and a sub-portion of the first electrolyte portion to be enriched with anions from the salt solution being separated by the anion exchange membrane means from the part of the dialysis cell containing said second electrolyte portion. Preferably, the sub-portions will be in separate flow communication with each other.

Accordingly, where the electrodes of the dialysis cell are water decomposition electrodes, water electrolysis will be carried out in the dialysis cell effectively simultaneously within the dialysis cell migration of electrolyte ions from the second electrolyte portion through the membrane means selective therefor to the counter electrode of opposite polarity and the first electrolyte portion. Where valve electrodes are used, the gas evolved at one of the electrodes may be conducted exteriorly of the cell to the opposite electrode for electrochemical dissolution theerat.

More significantly, reversible electro-dialysis of an ion disperse solution as electrolyte may be carried out in the dialysis cell with ion migration of the corresponding water ion through the membrane means selective therefor and electrochemical evolution of the gas at the counter electrode corresponding to the so-migrating water ion, simultaneously with the ion migration of the corresponding electrolyte ion of the same polarity. In this way, the evolved gas may be conducted back to the electrode on the other side of the membrane means for electrochemical dissolution thereat. Specifically, where the dialysis cell cathode is an oxygen dissolution electrode and the dialysis cell anode is an oxygen evolution electrode, the oxygen gas formed at the dialysis cell anode may be fed conveniently to the dialysis cell cathode for dissolution thereat. On the other hand, where the dialysis cell anode is a hydrogen dissolution electrode, and the dialysis cell cathode is a hydrogen evolution electrode, the hydrogen gas formed at the dialysis cell cathode may be fed conveniently to the dialysis cell anode for dissolution thereat. Hence, otherwise lost energy is utilized.

Where the electrolyte is selected from the group consisting of alkaline and acid aqueous electrolytees, a plurality of membrane means of the same ionic polarity may be used to form an even numbered series of electrolyte solution compartments in which the first compartment contains one electrode, and the last compartment contains the other electrode of opposite polarity, and in which the first and thereafter each odd numbered compartment in the series contains a sub-portion of the first electrolyte portion and in which the second and thereafter each even numbered compartment, including the last in the series, contains a sub-portion of the second electrolyte portion. In this manner, the first electrolyte sub-portions will be enriched with the electrolyte ions electrochemically separated from the adjacent second electrolyte sub-portions by ion migration through the corresponding membrane means selective therefor.

On the other hand, where the electrolyte is an aqueous salt solution, a plurality of membrane means may be used to form an odd numbered series of electrolyte solution compartments in which the first compartment contains one electrode, and the last compartment contains the other electrode of opposite polarity, and in which the first and thereafter each odd numbered compartment, including the last in the series contains a sub-portion of the first electrolyte portion, all of which first and odd numbered compartments are in flow communication with each other, and in which the second and thereafter each even numbered compartment in the series contains a sub-portion of the second electrolyte portion. Conveniently, each even numbered compartment will have a cation exchange membrane means on one side thereof and an anion exchange membrane means on the other side thereof. Accordingly, the first electrolyte subportions will become enriched with the corresponding electrolyte ions electrochemically separated from the adjacent second electrolyte sub-portions by ion migration through the corresponding membrane means selective therefor.

Concerning the apparatus used for carrying out the process in accordance with the invention, an improvement in a fuel cell arrangement having an electrolyte compartment and a pair of opposing electrodes positioned for the generation of electrical energy is provided, such improvement contemplating the positioning of an electrolytic dialysis cell in partial flow communication with the fuel cell. The dialysis cell may contain anode and cathode electrodes separated by electrolyte ion-selective dialysis membrane means with the fuel cell electrolyte compartment having an overflow conduit communicating directly with the portion of the dialysis cell on one side of the membrane means which is arranged for passing electrolyte from the electrolyte compartment thereto upon the reaching of a predetermined maximum volume of electrolyte in the electrolyte compartment. Significantly, the overflow conduit is provided with an overflow channel means indirectly communicating the overflow conduit with the portion of the dialysis cell on the other side of the membrane means, such channel means being arranged for passing excess electrolyte from the electrolyte compartment to the portion of the dialysis cell on the other side of the membrane means upon the reaching of a predetermined maximum volume of electrolyte in the portion of the dialysis cell on the said one side of the membrane means. Means are also conveniently provided for recycling electrolyte from said one side of the membrane means of the dialysis cell back to the electrolyte compartment of the fuel cell and for withdrawing spent electrolysis products from the other side of the membrane means of the dialysis cell.

In accordance with an alternate fuel cell arrangement, the fuel cell will contain an electrolyte compartment and a pair of opposing electrodes positioned for the generation of electrical energy in which an electrolytic dialysis half cell is provided in partial flow communication with the fuel cell. Specifically, the dialysis half cell is provided with an electrode positioned operatively adjacent and in conductive connection with one of the electrodes of the fuel cell of opposite polarity with respect thereto and separated therefrom by an intervening electrolyte ion-selective dialysis membrane means. The fuel cell electrolyte compartment is conveniently provided with an overflow channel means communicating indirectly with the dialysis half cell on the other side of the membrane means, such channel means being arranged for passing excess electrolyte from the electrolyte compartment to said other side of the membrane means, upon the reaching of a predetermined maximum volume of electrolyte in the electrolyte compartment. Advantageously, means are provided for conducting electrolyte from the vicinity of the membrane means in the electrolyte compartment to the remainder of said compartment to equalize the concentration of the electrolyte therewithin. Furthermore, means may be provided for withdrawing spent electrolyte products from the dialysis half cell for repeating the cycle. In accordance with the preferred embodiment, the electrode in the dialysis half cell and the corresponding electrode of opposite polarity with respect thereto of the fuel cell are provided as reversible gas diffusion electrodes. Specifically, the electrodialysis cell may consist of $2n$ chambers and/or $2n+1$ chambers which are separated from one another by ion exchange resin membrane means. The cells are positioned in the sequence $R_{11}$, $R_{12}$, $R_{21}$, $R_{22}$, $R_{31}$, $R_{32}$ ... $R_{n1}$, $R_{n2}$ and/or $R_{(n+1)1}$. The first and last chambers of the series contain the two electrodes, which, for convenience may be designated $E_1$ and $E_2$ of opposite polarity with respect to one another. The chambers $R_{11}$, $R_{21}$, etc., for example, which, for convenience may be designated chambers $R_{k1}$ may be continuously or periodically flushed with the electrolyte solution of the fuel cell whereas the chambers $R_{12}$, $R_{22}$, etc., which, for convenience, may be designated chambers $R_{k2}$ may be situated to take up the excess quantity of electrolyte solution being diluted with the reaction water forming during the fuel cell operation. Thus, the electrodialysis step will cause the electrolyte ions present in the electrolyte solution in the chambers $R_{k2}$ to be transferred through the exchange membrane means to the chambers $R_{k1}$. The remaining reaction water in chambers $R_{k2}$ may be readily withdrawn from the electrodialysis cell in order for the cycle to be repeated.

It will be appreciated that the electrodialysis arrangement in accordance with the invention is quite analogous in function to the normal physiological functions of the kidneys and bladder of a living organism.

With specific reference to a series of electro-dialysis chambers, it will be appreciated that where an alkaline aqueous solution is used as electrolyte for the carrying out of the process of the invention, the electrodialysis cell will possess an even number of chambers, wherein the membrane means between the chambers $R_{k1}$ and $R_{k2}$ will be cation exchange membrane means with the first chamber $R_{11}$ being the cathode chamber and the chamber $R_{n2}$ forming the anode chamber of the electrodialysis cell series arrangement.

Where the electrolyte is an aqueous solution of an acid, then the process in accordance with the invention may be carried out in an electrodialysis cell in the same way with an even number of chambers, but in this case the membrane means between the chambers $R_{k1}$ and $R_{k2}$ will be anion exchange membrane means. Thus, the first chamber $R_{11}$ will be the anode chamber while the last chamber $R_{n2}$ will be the cathode chamber of the electrodialysis cell series arrangement.

Where the electrolyte is an aqueous solution of a salt, then the electrodialysis cell arrangement will include $2n+1$ chambers, in which the chambers $R_{k1}$ and $R_{k2}$ are separated by cation exchange membrane means and anion exchange membrane means as the case may be. Chamber $R_{11}$ may represent the cathode chamber of the electrodialysis cell series arrangement whereas the chamber $R_{(n+1)1}$ may represent the anode chamber.

Figure 1:
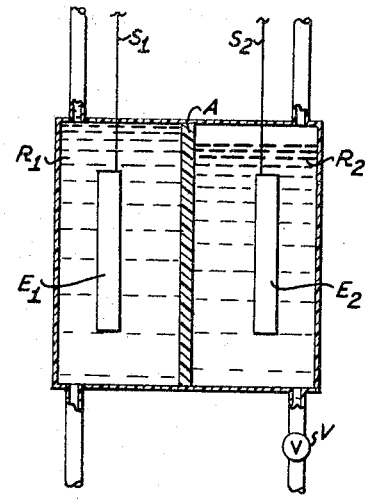
FIG. 1 is a schematic sectional view of an electro-chemical dialysis cell for carrying out the separation of the reaction water from a portion of the electrolyte, in accordance with one embodiment of the invention.

Referring to the drawing, FIG. 1 illustrates a manner of operating a dialysis cell arrangement in accordance with the invention for the separation of water from an alkaline electrolyte such as for example a potassium hydroxide solution as used in an oxyhydrogen gas fuel cell. The cell includes two chambers $R_1$ and $R_2$, which are separated from one another by a cation exchange member A. Chamber $R_1$ is flow connected with the electrolyte circulation system of the oxyhydrogen gas fuel cell. The electrode $E_1$ is placed in chamber $R_1$ and is provided with the current terminal $S_1$. On the other hand, chamber $R_2$ takes up the excess electrolyte solution which occurs as a result of the dilution thereof with reaction water, chamber $R_2$ containing the electrode $E_2$ which is provided with the current terminal $S_2$. In the lower part of chamber $R_2$, the valve V is provided in order to withdraw spent reaction water after completion of the separation of the electrolyte ions therefrom. Where the plus pole of a direct current voltage source is applied to the current terminal $S_2$ and the minus pole of such voltage source is applied to the current terminal $S_1$, electrode $E_2$ will be the anode and electrode $E_1$ will be the cathode of the dialysis cell. Thus, a direct current will flow through the cell which, because of the cation exchange membrane A, will be carried exclusively by cations. In this way, the electrolyte solution in chamber $R_2$ becomes increasingly diluted until finally its specific resistance reaches that of pure water. At such time, the valve V may be opened and the water discharged from $R_2$. During the further operation of the fuel cell, additional electrolyte solution, diluted with further reaction water, may be conducted to chamber $R_2$, preferably until such chamber is filled, whereupon the process may be repeated using the fresh electrolyte solution, for example KOH solution, which has been diluted with fresh reaction water. With repeated electrodialysis cell separation of reaction water, it has been found that significantly the entire KOH remains in the oxyhydrogen gas fuel cell, while only the excess reaction water produced in the fuel cell operation is separated electrochemically from the system. An efficient process is thereby possible wherein the entire quantity of the electrolyte ions will be retained in the arrangement and only the reaction water per se will be removed.

It will be appreciated that where the alkaline electrolyte such as KOH, has absorbed carbon dioxide, as is true when a fuel containing carbon and hydrogen is converted in a fuel cell operated with an alkaline electrolyte, such carbon dioxide is liberated in chamber $R_2$ in an effective manner and may be withdrawn therefrom, so that the electrolyte ions migrating through the membrane means will be separated not only from water but also from carbon dioxide as well.

Figure 2:
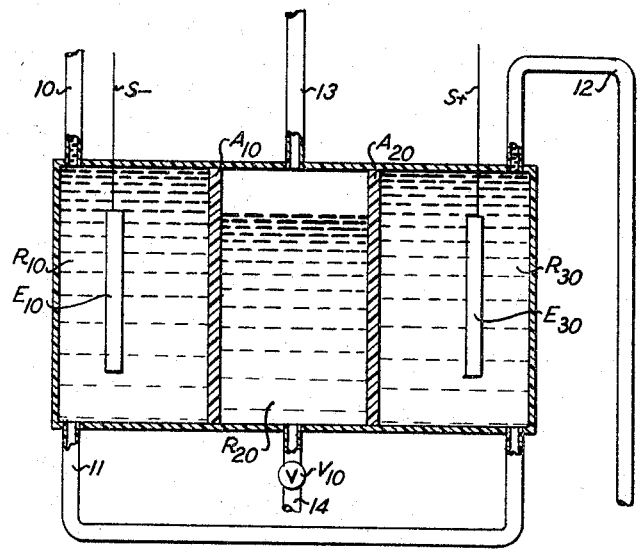
FIG. 2 is a schematic sectional view of a further embodiment of a dialysis cell used for carrying out the electro-chemical separation of the reaction water with respect to an aqueous salt solution used as electrolyte.

In FIG. 2, an arrangement is shown in simplified form for the treatment of salt solution which is used as electrolyte in the fuel cell. The dialysis cell consists of three chambers: $R_{10}$, $R_{20}$, and $R_{30}$ with Chamber $R_{10}$ being separated from $R_{20}$ by a cation exchange membrane $A_{10}$ and chamber $R_{20}$ being separated from chamber $R_{30}$ by an anion exchange membrane $A_{20}$. Chambers $R_{10}$ and $R_{30}$ are flow communicated with one another by means of the conduit 11, such that electrolyte sub-portions may be passed from the fuel cell through conduit 10 into chamber $R_{10}$, and in turn, through conduit 11 into chamber $R_{30}$, and thence through conduit 12 back to the fuel cell. Nevertheless, a parallel connection for flow communicating the electrolyte with chambers $R_{10}$ and $R_{30}$ may be used whereby the electrolyte may pass through either of these chambers rather than, in turn, through both of them. However, in accordance with such parallel arrangement, an electrical shunt-circuit is presented which is higher ohmic in comparison to the resistance of the earth plate of the dialysis cell. The middle chamber $R_{20}$ is filled with excess electrolyte solution to be treated for water removal and by placing the minus pole of a direct current voltage source at electrode $E_{10}$ and the plus pole of such voltage source at the electrode $E_{30}$, by means of the current terminals $S_-$ and $S_+$, respectively, current will flow through the cell. With respect to the cation exchange membrane $A_{10}$, such current is carried only by the cations, whereas with respect to chamber $R_{30}$, current is carried only by the anions. Therefore, electrode $E_{10}$ is the cathode of the electrodialysis cell while electrode $E_{30}$ is the anode of such cell. Accordingly, the electrolyte present in the middle chamber $R_{20}$ becomes diminished, until finally only water remains therein, which may be withdrawn from the system through the valve $V_{10}$ and the pipe outlet 14.

Of course, the removal of the excess reaction water from the electrolyte of the fuel cell may be carried out automatically such that the dialysis starts when a predetermined quantity of excess electrolyte solution has accumulated in the $R_{k2}$, whereupon after reaching a specific predetermined minimum concentration of electrolyte ions in the solution in chambers $R_{k2}$, such solution may be removed from the system. The electrodialysis will be interrupted for a period which will be determined by the pre-set quantity of excess electrolyte solution which is to be accumulated in the chambers $R_{k2}$ before the electrodialysis is automatically repeated.

Figure 3:
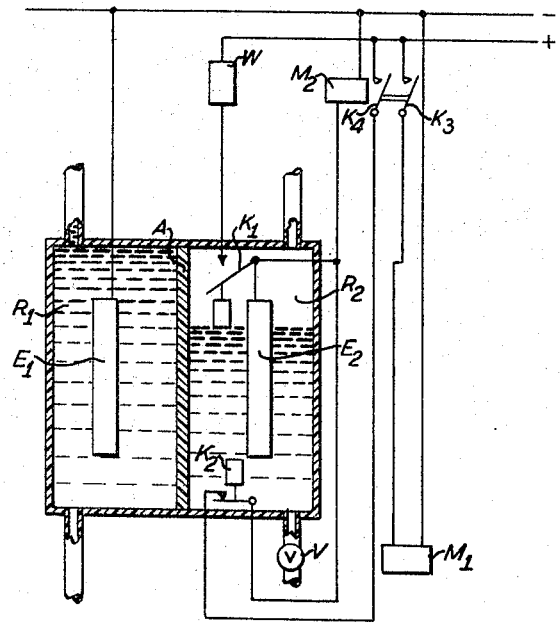
FIG. 3 is a schematic sectional view of a further embodiment of a dialysis cell for carrying out the electro-chemical separation of reaction water in accordance with the invention in an automatic manner, electro-mechanical means being used for this purpose.

Such automatic removal of the reaction water may be carried out in accordance with the embodiment of FIG. 3 wherein the same type of dialysis cell as that shown in FIG. 1 is used, but in this case certain automatic switching means are used for controlling the over-all operation so that the desired activity of this personified "electrodialytic kidney" may be automatically operated. Thus, $M_1$ is an electromagnet used for opening the valve V, such valve being normally closed. On the other hand, the magnet $M_2$ is an electromagnet controlling the switch relay for the operating switch contacts $K_3$ and $K_4$. The switch contacts $K_1$ and $K_2$ are operated by means of floats which close the switches $K_1$ and $K_2$ as the liquid level increases and which serve to open such switches when the liquid level decreases in chamber $R_2$. A suitable resistance W is provided in the return line from the electrode $E_2$ (anode). In the arrangement as shown in FIG. 3, the cell is not being operated since chamber $R_2$ is slowly being filled with excess electrolyte solution from the fuel cell. When the liquid level in chamber $R_2$ reaches the top portion of such chamber, the float of switch $K_1$ will cause the closing of such switch, whereupon the electrodialysis will start. In this connection, the cations, which may be $K^+$ in the case of an aqueous KOH electrolyte, are transferred through cation exchange membrane A into the chamber $R_1$. The switch relay magnet $M_2$ is so adjusted that it is not energized under the existing conditions to close the switch contacts $K_3$ and $K_4$. Once the cations have passed through the membrane A to the electrode $E_1$ (cathode), the resistance of the earth plate in chamber $R_2$ will be sufficiently great because of the dilution state to prevent the further flow of current from the minus pole voltage source through cathode $E_1$, the electrolyte in chamber $R_1$, and the diluted water solution in chamber $R_2$ for further passage from anode $E_2$ through switch $K_1$ and resistance W to the plus pole of the voltage source. Instead, the resistance of the diluted water solution in chamber $R_2$ will cause the current from the minus pole of the voltage source to take the parallel circuit through electromagnet $M_2$, switch $K_1$, and resistance W whereupon magnet $M_2$ will be energized to close the switch contacts $K_3$ and $K_4$. In turn, electromagnet $M_1$ will be energized so as to cause the opening of the valve V which is otherwise normally closed. The diluted water solution will thus be emptied from chamber $R_2$ through valve V and although switch $K_1$ will be open due to the lowering of the float thereof, current will continue to pass through the circuit including electromagnet $M_2$, switch $K_2$ and switch $K_4$ until the liquid level in chamber $R_2$ goes below the required float level of switch $K_2$. This will break the connection, causing electromagnet $M_2$ to become deenergized whereupon the switch contacts $K_3$ and $K_4$ will return to their normally open condition. By the opening of switch contact $K_3$ electromagnet $M_1$ becomes deenergized and valve V is allowed to return to its normally closed position. By providing the switch contacts $K_4$ and $K_3$ as self-holding switch contacts, and by providing the float switch $K_2$ in the desired manner, it is seen that electromagnet $M_2$ will remain energized and the valve V kept open until the chamber $R_2$ is finally empty. Such chamber may be considered analogous to the bladder of a living organism with the remaining part of the system being considered the kidney arrangement therefor. Of course, once the float switch $K_2$ is opened, electromagnet $M_2$ and $M_1$ will become deenergized and the valve V closed, so that the chamber $R_2$ is ready once again for the further receiving of diluted electrolyte until the starting condition has been reached once more, i.e. where float switch $K_1$ is closed.

It will be appreciated that the removal of the water from the chamber $R_2$ may be carried out as well by other automatic means using other techniques than those illustrated with respect to FIG. 3. In this connection the valve V may be opened or closed by means of a servo motor, if desired, and instead of float switch means, other switching elements may be used, such as electrolyte channels by which certain variations in the control means may be effected using customary control devices, all of which are within the purview and contemplation of the present invention.

In accordance with the embodiment of FIG. 4, the excess quantity of electrolyte solution, diluted with reaction water, is transferred advantageously through an overflow barrier which defines a predetermined maximum electrolyte level in the fuel cell. The electrolyte solution overflowing from the fuel cell will pass to the chambers $R_{k2}$ of the electrodialysis cell and upon the filling of the electrodialysis cell, the electrochemical separation may proceed. Thus, it is possible to transfer electrolyte from the fuel cell directly to the electrodialysis cell in one and the same arrangement. An electrolyte circulation system may be provided for the galvanic fuel cell in which a part of the electrodialysis cell is connected directly with the electrolyte circulation for the fuel cell. An alkalihydroxide electrolyte is used in this embodiment with respect to an oxyhydrogen gas fuel cell wherein the fuel cell contains the electrodes $D_1$ and $D_2$. The fuel cell is connected via the pipe line 1, provided with a ventilator and feed funnel L, with the chamber $R_1$ of the electrodialysis cell and in turn, through pipe line 3, circulation pump P and pipe line 4 once again with the oxyhydrogen gas fuel cell. Thus, the electrolyte concentration in the electrolyte compartment located in the fuel cell between the electrodes $D_1$ and $D_2$ may be constantly flushed with enriched electrolyte from the chamber $R_1$ by reason of the circulation system including the pipe line 1, the pipe line 3, the circulation pump P, and the return pipe line 4 so as to achieve a clockwise circulation of electrolyte. The electrodialysis cell is similar to that embodiment shown in FIG. 1 including the current terminals $S_1$ and $S_2$, respectively, for the electrodes $E_1$ and $E_2$ as well as the chambers $R_1$ and $R_2$ separated by the cation exchange membrane A. The pipe line 5 permits the withdrawal of spent liquid from chamber $R_2$ upon the opening of valve V leading to the discharge line 6. Where a number of chambers $R_{k1}$ are provided in series in the electrodialysis cell, the embodiment of FIG. 4 will permit the electrolyte solution to be circulated between the electrolyte chamber of the fuel cell, on the one hand, and the various chambers $R_{k1}$ of the electrodialysis cell, on the other hand, for efficient electrochemical separation in the desired manner.

With specific reference to FIG. 4, by reason of the overflow line leading from line 1 to chamber $R_1$, said chamber $R_1$ may be provided with sufficient electrolyte solution, in diluted form to fill the same completely. When this has occurred, further overflow from the fuel cell will take place through the channel means or pipe line 2 located at a higher liquid level than the conduit from the fuel cell through line 1 to chamber $R_1$. Therefore, when chamber $R_1$ is filled, the overflow will pass through line 2 to chamber $R_2$ and when the latter chamber has been sufficiently filled, the electrodialysis separation will be initiated. The electrolyte solution, of course, which overflows through line 2 to chamber $R_2$ is a measure to the extent of water formation occurring in the fuel cell operation. The electrodialysis cell electrochemical separation is carried out in the embodiment of FIG. 4 in the same manner as with the embodiment of FIG. 1, such that after the passage of the cations of the electrolyte (for example KOH) through the membrane means into chamber $R_1$, the remaining water may be effectively removed from chamber $R_2$ using pipe line 5, valve V, and discharge line 6 for this purpose.

With respect to FIG. 5, an execution of an oxyhydrogen gas fuel cell is shown using an alkali hydroxide solution wherein, in accordance with a further form of the present invention, the chamber $R_1$ of the electrodialysis cell is merged with the electrolyte chamber of the fuel cell. In this case, electrode $E_1$ is the oxygen electrode of the fuel cell, and simultaneously the cathode of the electrodialysis cell. On the other hand, the electrode $D_2$ is the hydrogen anode of the oxyhydrogen gas fuel cell. Chamber $R_2$ of the electrodialysis cell is separated from the electrolyte chamber of the oxyhydrogen gas fuel cell by means of the cation exchange membrane A. Such chamber $R_2$ of the electrodialysis cell may be said to represent an electrodialysis half cell. Such cell contains the oxygen anode $E_2$ which may be advantageously developed in the form of a valve electrode. By the electrolysis which is carried on in the electrodialysis cell, oxygen will be formed at the oxygen evolution anode $E_2$ and such oxygen may be conveniently recovered for passage to the supply line for the oxygen electrode of the fuel cell, i.e. the electrode $E_1$. The excess electrolyte solution passing through the chamber $R_1$, which in this case represents the electrolyte chamber of the fuel cell merged with the communicating electrolyte chamber of the dialysis cell, may pass in circulation by reason of the pump P so as to flush the enriched electrolyte portion in chamber $R_1$ in the vicinity of the membrane A to the top portion of the fuel cell, i.e. between the main portions of the electrodes $E_1$ and $D_2$. The current terminal $S_1$ is provided for the cathode $E_1$ of the electrodialysis cell whereas the current terminal $S_2$ is provided for the anode $E_2$ in chamber $R_2$. A similar overflow channel means is provided below the ventilator and funnel means L so that when an excess of diluted electrolyte is present in the fuel cell, such excess will overflow in chamber $R_2$ for the desired electrolytic separation to take place. The spent liquid from chamber $R_2$ may be withdrawn from valve V in the normal way.

If desired, the switch control system of FIG. 3 may be applied with respect to the embodiment of FIG. 5 for the automatic control of the electrodialysis operation. Moreover, as will be appreciated by the artisan, the circulation of the electrolyte need not necessarily be carried out by means of the pump P, but such circulation may be carried out as well by any other suitable means such as a thermo-siphon pump or through typical hot water heating circulation principles based upon the differences in density of portion of flowable liquids.

While the operation of the gas fuel cell shown in FIG. 5 was described with respect to an electrolyte which was an alkali hydroxide solution forming cation and hyroxyl ions, it will be appreciated that in connection with the embodiment of FIG. 5 as well as the embodiments of FIGS. 1, 3, and 4 that the same may be carried out equally well using an acid electrolyte solution rather than an alkali hydroxide solution. Such acid electrolyte solution may be a mineral acid solution, such as hydrochloric acid or sulfuric acid solution, but in the case of the carrying out of electrodialysis with an acid electrolyte, the electrode $E_1$ in chamber $R_1$ will become the anode while the electrode $E_2$ in chamber $R_2$ will become the cathode. Of course, correspondingly, the dialysis membrane A in such instance will become an anion exchange membrane and anions will migrate.

In the simplest case, where the dialysis current flows between random electrodes $E_1$ and $E_2$, for example in the form of nickel sheets, then between such electrodes, water is decomposed electrolytically during the electrodialysis. Such water represents the consumption of significant energy present in the system. The loss of energy from water electrolysis which occurs simultaneously with the electrodialysis of the electrolyte ions may be prevented and in fact such energy recovered in various ways.

In this connection, as aforesaid, the electrodes between which the dialysis current flows under simultaneous water recomposition, may take the form of valve electrodes wherein the electrode $E_1$ is a hydrogen evolution electrode and wherein the electrode $E_2$ is an oxygen evolution electrode. Such electrodes consist of a catalytically active porous working layer and a catalytically inactive porous surface layer, covering partly or completely such working layer and being solidly or rigidly connected therewith. The average pore radius of the surface layer at every point, of course, will be smaller than the average pore radius of the working layer. Electrodes of this type are disclosed in copending U.S. application Ser. No. 826,812, filed July 13, 1959, now Patent 320,1282. Such electrodes permit the polarization to be decreased and the electrolysis gases to be collected separately since such gases are separated at the more coarsely pored working layer and are unable to enter the electrolyte due to the fine pores of the surface layer. The evolved gas may be carried off from the working layer, advantageously, and fed to the gas supply lines of the oxyhydrogen gas fuel cell in any convenient manner.

With respect to the embodiment of the invention in which the electrodialysis may be carried out in a reversible manner, such that only the same ion peculiar to the solvent used, i.e. $H_3O^+$ or $OH^-$, will pass through the membrane disposed between the anode and cathode electrodes, it will be appreciated that the electrodialysis arrangement disclosed in copending U.S. Ser. No. 85,163 filed Jan. 26, 1961, now Patent No. 3,282,834, may be used effectively for this purpose. Specifically, as noted in said copending application, the cathode in question ($E_1$) may be an oxygen dissolution electrode while the anode ($E_2$) is an oxygen evolution electrode, preferably in the form of a valve electrode, or in the alternative, the cathode ($E_1$) may be a hydrogen evolution electrode with the anode ($E_2$) being a hydrogen dissolution electrode, such latter electrodes preferably being valve electrodes as well.

In accordance with the usual function of gas dissolution and gas evolution electrodes, the gas supply for the oxyhydrogen gas fuel cell arrangement in accordance with the invention will be fed to the appropriate gas dissolution electrode while the evolved gases from the valve electrodes will be returned to the gas supply. Therefore, reversible electrodialysis represents a system in which no gas is lost, whereas any extra expenditure of energy in practice is onl yneeded to overcome the concentration potential and internal resistance between the chambers $R_1$ and $R_2$ and the slight polarization of the gas electrodes, especially where double-skeleton catalyst electrodes are used. Advantageously, therefore, the foregoing reversible electrodialysis may be carried out with respect to acid electrolyte solutions as well as alkaline electrolyte solutions with the polarity of the anode and cathode electrodes being appropriately reversed as the case may be.

Where the electrolyte solution is to be separated from the reaction water formed during fuel cell operation, using a plurality of batteries consisting of fuel cells connected together in series, it will be appreciated that each individual fuel cell may be provided with a water removal arrangement in accordance with the invention. Nevertheless, it is possible also to supply all the fuel cells with enriched electrolyte from a common or joint electrolyte circulation system while effecting the removal of reaction water with the aid of a common electrodialysis cell or cell series arrangement. Hence, the electrolyte may be circulated, free from shunting or short-circuiting, by means of droplet channels disposed in the circulation flow path of each fuel cell. In most cases, it is sufficient to choose the dimensions of the circulation conduits in such a manner that the electrolyte portions flowing therethrough will possess high resistance with respect to the cell resistance of the earth plate whereby only insignificant or negligible shunt currents or short-circuits will occur between the cells.

While the electrodialysis cell arrangements have been described specifically with respect to those containing only two or three electrodialysis chambers, in many cases a greater number of dialysis cells may be operated together, using a correspondingly higher voltage. By increasing the number of chambers to $2n$ or $2n+1$, the degree of effectiveness of the water removal process is increased. One manner of increasing the number of chambers contemplates in a sense replacing all the ion exchange membrane means A of the electrodialysis cell shown in FIG. 1 by a pair of such membranes of the same polarity and disposing therebetween a pair of further ion exchange membrane means having the opposite polarity from the first pair. In this manner, where the outer two membranes A are cation exchange membranes, then the inner membrane will be an anion exchange membrane and vice versa. By this manner of increasing the number of chambers, a random increase may be effected leading to an arrangement having $n-1$ membranes in a electrodialysis cell series arrangement containing $2n$ chambers. While the first chamber $R_1$ and each second-next chamber in the series may be connected with the electrolyte circulation system of the fuel cell for passing electrolyte to and from such chambers, the remaining chambers located between the aforementioned chambers may be higher-ohmically connected among one another so that the effective separation of water from the electrolyte circulation system may be carried out. Where current flows through an electrodialysis cell series arrangement containing chambers $2n$, electrolyte from the even numbered chambers may be passed back into the electrolyte circulation of the fuel cell through the membrane means during the electrodialysis, whereby a corresponding $n$-fold quantity of water will be removed. The energy therefor will be the appropriate multiple of the energy required to remove the reaction water from a single chamber $R_2$. An increase in yield is obtained by a multiplication of the number of chambers in the electrodialysis cell arrangement which, aside from the correspondingly increased cell voltage, will permit the recovery of certain energy in the form of the electrolysis gases, hydrogen and oxygen, as noted hereinabove.

With specific refrence to a saline electrolyte solution, an increase in the number of chambers for the electrodialysis cell, such as that shown in FIG. 2, may be attained whereby a corresponding increase in the separation electrochemically of the reaction water may be carried out. Of course, the electrodialysis cell will contain $2n+1$ chambers, in which the first, third, fifth . . . and $(2n+1)$ chambers will be connected with the electrolyte circulation system of the fuel cell, whereas the intervening even numbered chambers will be connected in flow communication with one another for enrichment with the electrolyte ions from the saline odd numbered chambers through the membrane means.

Applying the foregoing description to the apparatus for carrying out the instant process, it will be seen that one or more fuel cells may be connected with an electrodialysis cell or series arrangement such as that having $2n$ and/or $2n+1$ chambers of the type $R_{k1}$ and $R_{k2}$ alternately separated from one another by cation and anion exchange membrane means as the case may be. In such an arrangement, the designations $k$ and $n$ having the following relationship:

$$1 \leq k \leq n \text{ and/or } n+1$$

The electrolyte chamber of each individual fuel cell is appropriately connected with the chambers $R_{k1}$ by means of a circulation system while the chambers $R_{k2}$ are connected in series via a battery such that the latter chambers act as overflow receptacles for increased volume electrolyte from the fuel cells, the overall result being that the electrodialysis cell arrangement limits the level or volume of electrolyte in the circulation system and in the fuel cells. The foregoing discussion is equally applicable to the modified situation wherein the chamber $R_{11}$ is simultaneously the electrolyte chamber of a fuel cell.

In its broadest sense the present invention relates to the concentration of an aqueous electrolyte by electrochemical separation of the electrolyte ions from the water in a portion of the electrolyte to be treated, in which such electrochemical separation is carried out in an electrochemical cell containing a first portion of the aqueous electrolyte as well as anode and cathode electrodes and electrolyte ion-selective dialysis membrane means separating such anode and cathode electrodes, whereby a second portion of the aqueous electrolyte to be treated may be passed into a part of the cell separated by such membrane means from at least one of the electrodes and the first electrolyte portion, so that current which may be conducted between the anode and cathode electrodes through the first electrolyte portion, the second electrolyte portion and the membrane means will cause migration of the corresponding electrolyte ion present in the second electrolyte portion through the membrane means selective therefor to the corresponding electrode and first electrolyte portion.

Accordingly, the first electrolyte portion may be recovered enriched with the electrolyte ions originally present in and electrochemically separated from the second electrolyte portion. Such process permits an economy in electrolyte make up for a fuel cell arrangement and a simple and expedient method for removing water at the source of water production, and in a preferred instance, with a conservation of the electrical energy required for water separation by reason of the use of dissolution and evolution electrodes which collect and electrochemically reuse gases evolved from ions of the solvent, such as water, being separated.

What is claimed is:

1. Process for operating a fuel cell using an aqueous electrolyte and reactants which electrochemically produce energy as well as water as reaction product, with the periodic electrochemical separation of said reaction water, which comprises carrying out the fuel cell operation continuously and, upon the reaching of a predetermined volume increase in the aqueous electrolyte due to the reaction water produced, passing a first perdetermined excess volume portion of the electrolyte during further fuel cell operation to an electrolytic dialysis cell having anode and cathode electrodes and electrolyte ion-selective dialysis membrane means separating the anode and cathode electrodes of the electrolytic dialysis cell and then passing a second predetermined excess volume portion of the electrolyte during further fuel cell operation to a part of the electrolytic dialysis cell separated by said membrane means from at least one of said electrodes and the first excess portion, then conducting current between the anode and cathode electrodes of the electrolytic dialysis cell through the said first excess portion and the said second excess portion and the membrane means to cause the migration of the corresponding electrolyte ions present in said second excess portion through the membrane means selective therefor to the counter electrode of opposite polarity and the first excess portion, and recycling the first excess portion enriched with the electrolyte ions electrochemically separated from the second excess portion back to the aqueous electrolyte of the fuel cell while withdrawing the second excess portion for the reception of fresh second excess portion during the further operation of the fuel cell.

2. Process according to claim 1 wherein the fuel cell operation forms water by the electrochemical combustion of oxygen with hydrogen.

3. Process according to claim 1 wherein the electrolyte solution in said fuel cell is continuously circulated between said fuel cell and the part of said electrolytic dialysis cell containing said first excess portion.

4. Process for operating a fuel cell having cathode and anode electrodes and using an aqueous electrolyte and reactants which electrochemically produce energy as well as water as reaction product, with the periodic electrochemical separation of the reaction water, which comprises carrying out the fuel cell operation and, upon the reaching of a predetermined volume increase in the aqueous electrolyte due to the reaction water produced, passing a predetermined diluted excess volume portion of the electrolyte during further cell operation to an electrolytic dialysis half cell having an electrode and being separated by an ion-selective dialysis membrane means from the electrolyte in the fuel cell so as to form a dialysis cell with a corresponding counter electrode of opposite polarity in the fuel cell, then conducting current between the electrode of the half cell and the corresponding counter electrode of the fuel cell through the electrolyte in the fuel cell, the electrolyte portion in the half cell and the membrane means to cause the migration of the corresponding electrolyte ions present in said electrolyte portion in the half cell through the membrane means selective therefor to the corresponding counter electrode and the electrolyte in the fuel cell to enrich the electrolyte in the fuel cell therewith, and discarding the remaining electrolyte portion from the half cell for the reception of fresh diluted excess portion during the further operation of the fuel cell.

5. Process according to claim 4 wherein the portion of the electrolyte in the vicinity of said corresponding counter electrode in the fuel cell to which said electrolyte ions migrate is circulated through the fuel cell to distribute the electrolyte ions evenly therethrough.

6. Process according to claim 4 wherein the fuel cell operation forms water by the electrochemical combustion of oxygen with hydrogen-containing fuel, the said corresponding counter electrode in the fuel cell being the oxidant electrode of the fuel cell and simultaneously the cathode of the dialysis cell.

7. Process according to claim 4 wherein the fuel cell operation forms water by the electrochemical combustion of oxygen with hydrogen-containing fuel, the said corresponding counter electrode in the fuel cell being the fuel electrode of the fuel cell and simultaneously the anode of the dialysis cell.

8. Process according to claim 4 wherein the electrodes of the dialysis cell are water decomposition electrodes, and water electrolysis is carried out in the dialysis cell by applying electrolysis current between the electrode in the half cell and the said corresponding counter electrode in the fuel cell simultaneously with the dialysis cell migration of electrolyte ions from the half cell through the membrane means to the corresponding counter electrode in the fuel cell, the electrolytic gases formed at the electrode in the half cell and the said corresponding counter electrode in the fuel cell being used as fuel gas and oxidant in the fuel cell operation.

9. Process according to claim 8 wherein with respect to the dialysis cell, the half cell electrode and the corresponding counter electrode in the fuel cell are porous valve electrodes.

10. Process according to claim 9 wherein the valve electrodes are at least partially immersed in the respective electrolyte solution and include a catalytically active porous working layer and a catalytically inactive surface layer, a portion of said surface layer covering at least the portion of said working layer of the electrode immersed in the respective electrolyte solution and being connected thereto, the portion of said surface layer covering said portion of said working layer being porous and having an average pore radius which is maller than the average pore radius of said working layer, the working layer being in separate communication with a gas space for the collection of gas electrochemically formed in the water electrolysis.

11. In the process for operating a galvanic fuel cell having anode and cathode electrodes and an aqueous electrolyte for the production of electrical energy in which hydro-containing fuel is electrochemically converted with the formation of water as reaction product, the improvement which comprises carrying out the fuel cell operation with the periodic electrochemical separation of the reaction water upon the reaching of a predetermined volume increase in the aqueous electrolyte due to the production of such reaction water, by passing a first portion of the electrolyte to an electrodialysis cell containing anode and cathode electrodes and electrolyte ion-selective dialysis membrane means separating the anode and cathode electrodes of the dialysis cell and by passing a second portion of the electrolyte into a part of the dialysis cell separated by said membrane means from at least one of said electrodes of said dialysis cell and the first electrolyte portion, conducting current between the anode and cathode electrodes of the dialysis cell and through the said first electrolyte portion, the second electrolyte portion and the membrane means to cause the migration of the corresponding electrolyte ions present in said second electrolyte portion through the membrane means selective therefor to the counter electrode of opposite polarity and said first electrolyte portion, and recovering the first electrolyte portion enriched with the electrolyte ions electrochemically separated from the second electrolyte portion.

12. Improvement according to claim 11 wherein the electrolyte is selected from the group consisting of an alkaline aqueous solution, an aqueous solution of an acid and an aqueous salt solution, and wherein:
when said electrolyte is an alkaline aqueous solution then said membrane means are cation exchange membrane means and the cathode and first electrolyte portion are separated by the membrane means from the part of the dialysis cell containing the second electrolyte portion with the anode being in contact with the second electrolyte portion; and
when said electrolyte is an aqueous solution of an acid then said membrane means are anion exchange membrane means and the anode and the first electrolyte portion are separated by the membrane means from the part of the dialysis cell containing the second electrolyte portion with the cathode being in contact with the second electrolyte portion; while
when said electrolyte is an aqueous salt solution then said membrane means are both cation exchange membrane means and anion exchange membrane means with the cathode and a sub-portion of the first electrolyte portion to be enriched with cations from the salt solution being separated by the cation exchange membrane means from the part of the dialysis cell containing the second electrolyte portion and from the anion exchange membrane means, and with the anode and a subportion of the first electrolyte portion to be enriched with anions from the salt solution being separated by the anion exchange membrane means from the part of the dialysis cell containing the second electrolyte portion, said sub-portions being in separate flow communication with each other.

13. Improvement according to claim 11 wherein the recovered first electrolyte portion enriched with the electrolyte ions electrochemically separated from the second electrolyte portion is recycled back to the fuel cell and the second electrolyte portion is withdrawn for the reception of fresh second electrolyte portion upon the further operation of the fuel cell.

14. Improvement acccording to claim 11 wherein the electrolyte is selected from the group consisting of alkaline and acid aqueous electrolytes, a plurality of membrane means of the same ionic polarity being used to form an even numbered series of electrolyte solution compartments in which the first compartment contains one electrode and the last compartment contains the other electrode of opposite polarity, and in which the first and thereafter each odd numbered compartment in the series contains a sub-portion of the first electrolyte portion and in which the second and thereafter each even numbered compartment including the last in the series contains a sub-portion of the second electrolyte portion, whereby the first electrolyte sub-portions will be enriched with the electrolyte ions electrochemically separated from the adjacent second electrolyte sub-portions by ion migration through the corresponding membrane means selective therefor.

15. Improvement according to claim 11 wherein the electrolyte is an aqueous salt solution, a plurality of membrane means being used to form an odd numbered series of electrolyte solution compartments in which the first compartment contains one electrode and the last compartment contains the other electrode of opposite polarity, and in which the first and thereafter each odd numbered compartment including the last in the series all of which first and odd numbered compartments are in flow communication with each other, contains a sub-portion of the first electrolyte portion and in which the second and thereafter each even numbered compartment in the series contains a sub-portion of the second electrolyte portion, each even numbered compartment having a cation membrane means on one side thereof and an anion membrane means on the other side thereof, whereby the first electrolyte sub-portions will be enriched with the corresponding electrolyte ions electrochemically separated from the adjacent second electrolyte sub-portions by ion migration through the corresponding membrane means selective therefor.

16. Improvement according to claim 12 wherein the current being conducted between the electrodes of the dialysis cell starts automatically upon the filling to a predetermined amount of that part of the dialysis cell containing the second electrolyte portion, said current ceasing to flow when substantially all of the electrolyte ions have migrated through the membrane means leaving substantially only water in said part of the dialysis cell such that the resistance to electron flow through the dialysis cell reaches a predetermined maximum, thereupon in response to such maximum resistance the part of the dialysis cell containing such water is automatically emptied thereof and the filling with a fresh second electrolyte portion repeated.

17. Improvement according to claim 13 wherein the electrodes of the dialysis cell are water decomposition electrodes and water electrolysis is carried out in the dialysis cell simultaneously with the dialysis cell migration of electrolyte ions from the second electrolyte portion through the membrane means selective therefor to the counter electrode of opposite polarity and the first electrolyte portion.

18. Improvement according to claim 17 wherein the electrodes of the dialysis cell are valve electrodes including a catalytically active porous working layer having a portion in separate communication with a gas space, the remainder of said working layer being covered with a catalytically inactive porous surface layer connected thereto and having an average pore radius which is smaller than the average pore radius of said working layer, said surface layer being in contact with the corresponding electrolyte portion.

19. Improvement according to claim 18 wherein reversible electrodialysis of an ion disperse solution as electrolyte is carried out in the dialysis cell with ion migration of the corresponding water ion through the membrane means selective therefor and electrochemical evolution of the gas at the counter electrode corresponding to the so-migrating water ion, simultaneously with the ion migration of the corresponding electrolyte ion of the same polarity, the evolved gas being conducted back to the electrode on the other side of the membrane means for electrochemical dissolution thereat.

20. Improvement according to claim 19 wherein the dialysis cell cathode is an oxygen dissolution electrode and the dialysis cell anode is an oxygen evolution electrode, the gas formed at the dialysis cell anode being fed to the dialysis cell cathode for dissolution thereat.

21. Improvement according to claim 19 wherein the dialysis cell anode is a hydrogen dissolution electrode and the dialysis cell cathode is a hydrogen evolution electrode, the gas formed at the dialysis cell cathode being fed to the dialysis cell anode for dissolution thereat.

22. In a fuel cell arrangement having an electrolyte compartment and a pair of opposing electrodes positioned for the generation of electrical energy, the improvement which comprises providing an electrolytic dialysis cell in partial flow communication therewith, said dialysis cell containing anode and cathode electrodes separated by electrolyte ion-selective dialysis membrane means, said fuel cell electrolyte comparement having an overflow conduit communicating directly with the portion of said dialysis cell on one side of said membrane means arranged for passing electrolyte from said electrolyte compartment thereto upon the reaching of a predetermined maximum volume of electrolyte in said electrolyte compartment, said overflow conduit having an overflow channel means indirectly communicating said overflow conduit with the portion of said dialysis cell on the other side of said membrane means and arranged for passing excess electrolyte from said electrolyte compartment thereto upon the reaching of a predetermined maximum volume of electrolyte in the portion of said dialysis cell on said one side of the membrane means, and means for recycling electrolyte from said one side of the membrane means of said dialysis cell back to said electrolyte compartment of the fuel cell and for withdrawing spent electrolysis products from the other side of the membrane means of the dialysis cell.

23. In a fuel cell arrangement having an electrolyte compartment and a pair of opposing electrodes positioned for the generation of electrical energy, the improvement which comprises providing an electrolytic dialysis half cell in partial flow communication therewith, said dialysis half cell having an electrode positioned operatively adjacent and in conductive connection with one of the electrodes of said fuel cell of opposite polarity with respect thereto and separated therefrom by an intervening electrolyte ion-selective dialysis membrane means, said fuel cell electrolyte compartment having an overflow channel means communicating indirectly with said dialysis half cell on the other side of said membrane means and arranged for passing excess electrolyte from said electrolyte compartment thereto upon the reaching of a predetermined maximum volume of electrolyte in said electrolyte compartment, and means for conducting electrolyte from the vicinity of said membrane means in said electrolyte compartment to the remainder of said compartment and for withdrawing spent electrolysis products from said dialysis half cell.

24. Improvement according to claim 23 wherein said electrode in the dialysis half cell and the corresponding electrode of opposite polarity with respect thereto of said fuel cell are reversible gas diffusion electrodes.

References Cited

UNITED STATES PATENTS

| | | | |
|---|---|---|---|
| 2,636,852 | 4/1953 | Juda et al. | 204—151 |
| 2,700,063 | 1/1955 | Manecke | 136—153 |
| 2,752,306 | 6/1956 | Juda et al. | 204—151 |
| 2,784,158 | 3/1957 | Bodamer et al. | 204—151 |
| 2,799,638 | 7/1957 | Roberts | 204—151 |
| 2,925,455 | 2/1960 | Eidensohn et al. | 136—86 |
| 3,002,039 | 9/1961 | Bacon | 136—86 |

ALLEN B. CURTIS, *Primary Examiner.*

JOHN H. MACK, WINSTON A. DOUGLAS,
*Examiners.*

H. FEELEY, *Assistant Examiner.*